United States Patent
Falk

(10) Patent No.: US 11,403,406 B2
(45) Date of Patent: Aug. 2, 2022

(54) METHOD AND CONFIRMATION DEVICE FOR CONFIRMING THE INTEGRITY OF A SYSTEM

(71) Applicant: Siemens Aktiengesellschaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/770,290

(22) PCT Filed: Oct. 26, 2018

(86) PCT No.: PCT/EP2018/079361
§ 371 (c)(1),
(2) Date: Jun. 5, 2020

(87) PCT Pub. No.: WO2019/110196
PCT Pub. Date: Jun. 13, 2019

(65) Prior Publication Data
US 2020/0380137 A1    Dec. 3, 2020

(30) Foreign Application Priority Data
Dec. 8, 2017  (EP) .................................... 17206180

(51) Int. Cl.
*H04L 9/00* (2022.01)
*G06F 21/57* (2013.01)
*H04L 9/06* (2006.01)

(52) U.S. Cl.
CPC .......... *G06F 21/577* (2013.01); *H04L 9/0643* (2013.01); *G06F 2221/034* (2013.01)

(58) Field of Classification Search
CPC ..................................................... G06F 21/577
(Continued)

(56) References Cited

U.S. PATENT DOCUMENTS

| 7,770,000 B2 * | 8/2010 | Schunter ................. G06F 21/57 713/155 |
| 10,228,924 B2 * | 3/2019 | Berger ................. G06F 9/45533 |

(Continued)

FOREIGN PATENT DOCUMENTS

EP    3217310 A1    9/2017

OTHER PUBLICATIONS

International Search Report and Written Opinion in corresponding PCT Patent Application No. PCT/EP2018/079361, dated Feb. 1, 2019. 18 pages.

(Continued)

*Primary Examiner* — Christopher J Brown
(74) *Attorney, Agent, or Firm* — Schmeiser, Olsen & Watts LLP

(57) ABSTRACT

A method for computer-aided testing and confirmation of at least one system state of a first system by a confirmation device, is provided. After the testing of a first item of integrity information, which is provided by the first system, the confirmation device provides a second, combined item of integrity information and confirms the same cryptographically. The second item of integrity information includes at least part of the first item of integrity information and can be transmitted to a second system, in order to confirm the integrity of the first system to the latter. A confirmation device, to a first system, to a second system and to a computer program product in order to carry out the steps of the method is also provided.

14 Claims, 4 Drawing Sheets

(58) Field of Classification Search
USPC .......................................................... 726/25
See application file for complete search history.

(56) References Cited

U.S. PATENT DOCUMENTS

| | | | |
|---|---|---|---|
| 10,541,816 B2* | 1/2020 | Goldman | G06F 9/4416 |
| 2005/0132031 A1 | 6/2005 | Sailer et al. | |
| 2005/0138384 A1* | 6/2005 | Brickell | G06F 21/57 |
| | | | 713/182 |
| 2008/0256595 A1 | 10/2008 | Schunter et al. | |
| 2009/0300348 A1* | 12/2009 | Aciicmez | H04L 63/08 |
| | | | 713/156 |
| 2010/0223656 A1* | 9/2010 | Ray | H04L 9/3271 |
| | | | 726/3 |
| 2011/0138188 A1 | 6/2011 | Lee et al. | |
| 2016/0098555 A1* | 4/2016 | Mersh | G06F 21/51 |
| | | | 713/187 |
| 2018/0114000 A1* | 4/2018 | Taylor | G06F 21/121 |

OTHER PUBLICATIONS

European Search Report in related European Patent Application No. 17206180.6, dated Mar. 12, 2018. 9 pages.

\* cited by examiner

METHOD AND CONFIRMATION DEVICE FOR CONFIRMING THE INTEGRITY OF A SYSTEM

CROSS-REFERENCE TO RELATED APPLICATIONS

This application is a national stage entry of PCT Application No. PCT/EP2018/079361, having a filing date of Oct. 26, 2018, which claims priority to European Patent Application No. 1726180.6, having a filing date of Dec. 8, 2017, the entire contents of which are hereby incorporated by reference.

FIELD OF TECHNOLOGY

The following relates to a method for the computer-aided inspection and cryptographic confirmation of at least one system state of a first system using a confirmation device.

BACKGROUND

It is known that a first system, in particular a computer system, determines integrity information and confirms said integrity information with a second computer system in a cryptographically protected manner. This is also referred to as attestation or integrity attestation. The second computer system is thereby able to recognize whether the first computer system is in a trustworthy state, that is to say for example has loaded trusted software or a virus scanner is activated. Trusted platform modules, also referred to as TPM for short, are known for the integrity attestation, these in particular being used by a Linux integrity measurement architecture, IMA for short.

The integrity of a system may be recorded in the form of an integrity value that is issued by a platform configuration register. The integrity value is in this case usually calculated using a cryptographic hash function, such as for example the secure hash algorithm SHA-1 or SHA-256, using at least one measured value of a system state. In order also to inspect the integrity value of a system in terms of content, information about how the measured value came about or how the measurement was performed is necessary. This additional information, for example a file name or an item of software, may likewise be provided. This is implemented for example in the Linux integrity measurement architecture. In the Linux integrity measurement architecture, all of the measurement information is provided in addition to an integrity value in order also to be able to check the integrity value in terms of content. All of the measured values and associated measurement information are for this purpose recorded in a list, for example what is called an IMA file. Providing detailed information about a system in this way may be undesirable, in particular in the case of an industrial data exchange.

US2005/132031 discloses a method for providing an attestation and/or integrity check of a running system, wherein the system is able to be checked through remote access.

The mutual attestation of integrity has been proposed, inter alia, for industrial data gateways for an industrial data exchange, or also industrial data space, IDS for short. When exchanging in some cases confidential data via data gateways, it is desirable for a gateway to be able to inspect the trustworthiness of another gateway prior to a data exchange. This application may be understood to be a peer-to-peer scenario in which two data gateways of the same type mutually confirm the integrity. Known applications of an attestation are on the other hand based on a client-server relationship, that is to say a client confirms its integrity to a server that is assumed to be trustworthy. Other data exchange methods are also conceivable.

The object thus arises of finding an option for checking and cryptographically confirming the integrity of a system without disclosing confidential information.

SUMMARY

An aspect relates to a method for the computer-aided inspection and cryptographic confirmation of at least one system state of a first system using a confirmation device, having the method steps of:
recording first integrity information of the first system that comprises an integrity value, at least one measured value and at least one item of measurement information, wherein
the at least one measured value and the at least one item of measurement information are recorded in at least one measurement of the at least one system state,
the integrity value is calculated depending on the at least one measured value,
the integrity value is cryptographically confirmed by a first trust module of the first system,
transmitting the first integrity information to the confirmation device,
inspecting the first integrity information in the confirmation device against a first inspection rule,
providing second integrity information, wherein the second integrity information comprises at least part of the first integrity information and a summary and/or generalization of the first integrity information, and
cryptographically confirming the second integrity information using a second trust module in the confirmation device.

The method is advantageous since second integrity information that comprises at least part of the first integrity information is in particular provided. Only part of the first integrity information is thus provided.

This implementation is possible since the first integrity information is evaluated, that is to say inspected, in the confirmation device. The cryptographic validity of the integrity value is inspected, and the configuration of the first system is inspected on the basis of the measured values and measurement information. Second integrity information that comprises parts of the first integrity information is then provided in the confirmation device. The described integrity confirmation of the first system therefore takes place in several steps. This is desirable in particular when the first integrity information contains sensitive information that should not for example be disclosed to others.

In this method, the confirmation device may inspect first integrity information of the first system against a first inspection rule and then issue second integrity information. The first inspection rule may for example be a predefined, expected configuration of the first system. The first integrity information comprises an integrity value that is calculated depending on the at least one measured value and then confirmed, and at least this measured value and associated measurement information. By way of example, the at least one measured value and the associated measurement information may be stored in a list, for example what is known as an IMA measurement list.

A system may in particular be a computer system, a software system or a virtual machine. A system may in particular comprise at least one processor, at least one storage unit, or at least one signal processor. "Computer-aided" in connection with the embodiment of the present invention may be understood to mean for example an implementation of the method in which a processor in particular executes at least one method step of the method.

A system state of a system in particular indicates a particular given state of the software and/or hardware of the system, for example at a given time. This may for example be the presence of an installed item of software or a running operating system.

A state may for example be measured by an item of software that returns a measured value. The measurement information regarding the measured value comprises for example information about the item of software that performs the measurement. An item of software that performs the measurement is also called a root of trust for measurement.

Inspecting the integrity of a system reveals for example whether a system is in a trustworthy state, for example has loaded a particular required virus scanner. The integrity may be described in an integrity value that is able to be inspected against an inspection rule. By way of example, an inspection rule may comprise a predetermined value with which the integrity value is compared. The integrity value is calculated depending on at least one measured value. The integrity value is in particular calculated using a hash function that is applied to the at least one measured value. The integrity value is calculated recursively using a multiplicity or a plurality of measured values.

The configuration of a system comprises for example additional information about states or loaded software. In order to inspect a configuration of a system, the measurement information is in particular necessary. The integrity value is in particular insufficient for determining details of the configuration of a system.

The integrity value may be confirmed in the first system for example using a cryptographic checksum of a trust module, for example a trusted platform module. The cryptographic signature of the confirmed integrity value is for example checked for mathematical correctness, validity and applicability of an assigned certificate in the confirmation device and the integrity of the first system is thus in particular validated. On the basis of the measured values and measurement information of the first integrity information, the first system is also able to be inspected in terms of content by the confirmation device, for example as to whether particular software has loaded. There may be a check, what is called a whitelisting, as to whether only trusted software that is permissible according to predefined configuration information of a whitelist has loaded. A whitelist or else positive list comprises for example trusted software. Such whitelist configuration information may in particular comprise a file name and a cryptographic hash value of permitted software modules. The confirmation device thus evaluates the configuration of the first system or inspects it in terms of content. After the inspection, the confirmation device provides second integrity information that is confirmed for example by a digital signature. The second integrity information comprises non-sensitive, permitted or required information about the integrity of the first system and may in particular be able to be assigned to the first system. This is in particular advantageous since simple gateways are often not able to evaluate the detailed first integrity information in practice.

The second integrity information represents for example just a generalized or abstract version or a summary of the first integrity information. This is advantageous since for example the computing time for the inspection is reduced. The first integrity information may thus for example contain detailed information about the configuration of the first system, which is output by the confirmation device in reduced form as second integrity information. A summary after an evaluation of the first integrity information in terms of content may in particular be recorded. This is advantageous in particular in the case of industrial components or gateways that have to be rebooted only very rarely, for example normally at most once a year in a fixed maintenance window. In such components, the first integrity information grows increasingly during the operating period of the component.

In one advantageous embodiment of the method, the confirmed second integrity information is provided to the first system and inspected against a second inspection rule in the first system.

The second, generalized, integrity information comprises required attestation information that may be provided to the first system. The first system may thus inspect its own integrity for example against a second inspection rule, for example mathematical validity of a signature. It is therefore in particular not necessary to inspect a large number of individual measurements, as in the case of the first integrity information. If a valid integrity confirmation is present, the first system may for example authorize an interface for data transmission.

In one advantageous embodiment of the method, the confirmed second integrity information is provided to a second system and inspected against a third inspection rule in the second system.

The second integrity information may for example be provided to a second system, for example a peer node in an industrial data exchange. The confirmation device takes over the inspection and confirmation of the integrity of the first system. The result of the examination, as second integrity information, is transmitted to the second system. The second integrity information may confirm to the second system, in abstract form, that the first system is in a trustworthy system state. If the inspection against the third inspection rule reveals for example that the first system does not have a required system configuration, the second system may for example deactivate an interface for communication with the first system.

In one advantageous embodiment of the method, the confirmation device recognizes weak points in the first system on the basis of the first integrity information and transmits information about the weak points to the first system.

Weak points in the first system, such as for example out-of-date software versions, may be recognized in the inspection of the first integrity information in the confirmation device. By way of example, the confirmation device may establish, in the inspection in terms of content against a first inspection rule, whether the first system is not in a trustworthy state, that is to say for example has weak points. Second integrity information may in particular be issued in the confirmation device, which second integrity information declares the integrity confirmation of the first system as invalid. If for example there is no valid integrity confirmation from the confirmation device, the first system may initiate countermeasures, such as for example block one or more network interfaces or terminate or uninstall installed applications.

In one advantageous embodiment of the method, the first integrity information is inspected in the confirmation device depending on a second system to which the second integrity information is provided, and the second integrity information is output depending on the second system.

The first integrity information is summarized and provided as second integrity information such that it meets requirements of a second system to which it is intended to be provided. In other words, only information about the first system to which the second system for example has rights is communicated to said second system. The first integrity information is first of all inspected in the confirmation device depending on the second system, for example a system state of the second system. By way of example, the second system may be in a maintenance state. The confirmation device therefore in particular creates second integrity information that depends for example on the type, the system state or on rights of the second system. The confirmation device has information about the second system, such that the integrity inspection and integrity confirmation of the first system may be created depending on the second system.

In one advantageous embodiment of the method, the second integrity information is confirmed in the confirmation device by a second trust module together with a nonce.

The cryptographic confirmation of the second integrity information may in particular incorporate a nonce, for example a random value. The nonce may for example be provided by the confirmation device or by the second system to which the second integrity information is transmitted. This is advantageous since the second integrity information thus in particular contains information about the systems involved in the communication. An unambiguous assignment may thus for example take place; in other words, the second integrity information is assigned to the second system by the nonce.

In one advantageous embodiment of the method, the integrity value is calculated using measurements of the system state of the first system and using at least one nonce.

An integrity value of the first system is for example calculated depending on individual measured values of a respective system state. The integrity value is calculated for example by way of a hash function. Depending on the measurements, the integrity value is updated, wherein the measurements are processed in succession. A trust module of the first system cryptographically confirms the integrity value. The integrity value is calculated using the measurements and at least one nonce, for example a random value. This has the advantage that it is not possible to conclude as to a configuration of the first system from the integrity value. The nonce may furthermore for example be provided together with the measured values and measurement information.

In one advantageous embodiment of the method, the second integrity information comprises information about a security status of the first system.

The confirmation device may in particular provide second integrity information such that, in addition to the integrity confirmation of the first integrity information, information about the security status of the first system is also recorded therein. In other words, the integrity of the first system is inspected by the confirmation device and the security status is determined by evaluating the first integrity information in terms of content and information about same is provided. The information about the security status may for example comprise out-of-date software versions, installation status of security updates, etc. In addition to the integrity confirmation, it is therefore possible to issue a statement about the security level of the first system during the check.

In one advantageous embodiment of the method, a data exchange takes place between the first system and the second system after the integrity and/or the configuration of the first system has been declared as valid in the confirmation device.

The first system confirms its integrity to a second system, wherein the confirmation device takes over the integrity inspection and confirmation. If the integrity of the first system is validated, this may authorize an interface in order to initialize a data exchange with the second system. This is advantageous in order for example to allow a secure data transfer only when trustworthiness has been confirmed. By way of example, a data exchange of a particular category of data may be permitted depending on the issued second integrity confirmation. An exchange of data identified as "confidential", or only an exchange of data identified as "internal", may thus be permitted or blocked depending on the confirmation, for example.

According to a further aspect, the embodiment of the present invention relates to a confirmation device for the computer-aided inspection and cryptographic confirmation of at least one system state of a first system, comprising:
  a reception module that is designed to receive first integrity information of the first system,
  a storage module that is designed to store the first integrity information,
  a first inspection module that is designed to inspect the first integrity information against a first inspection rule,
  a provision module that is designed to provide second integrity information, wherein the second integrity information comprises at least part of the first integrity information and a summary and/or generalization of the first integrity information, and
  a second trust module that is designed to cryptographically confirm the second integrity information.

The confirmation device may for example provide a service for attesting the integrity of a first system to a second system. The confirmation device may be implemented for example as a cloud-based service. It may for example be a central apparatus, for example a server, that allows an integrity inspection and confirmation of another system. The confirmation device checks the first integrity information and creates and confirms second integrity information that is able to be provided to a second system. A multi-stage integrity confirmation is thus in particular achieved using the confirmation device. The confirmation device may be switched between two systems that communicate with one another such that said systems are able to mutually confirm the integrity, wherein only permissible or only required information about the respective other system is transmitted. According to the embodiment of the present invention, the confirmation and inspection take place in the confirmation device, which provides second integrity information, such as for example a summary of the first integrity information. The second integrity information, the at least part of first integrity information of a first system, is in particular provided to another system.

According to a further aspect, the embodiment of the present invention relates to a first system, comprising:
  an integrity recording module that is designed to record first integrity information of the first system that comprises an integrity value, at least one measured value and at least one item of measurement information, wherein a measurement unit records at least one measured value and at least one item of measurement information in at least one measurement of the at least one system state, and an integrity unit calculates an integrity value depending on the at least one measured value, a first trust module that is designed to confirm the first integrity information, a transmission module that is designed to transmit the first integrity information to a confirmation device, and a second inspection module that is designed to inspect second integrity information against a second inspection rule, wherein the second integrity information comprises at least part of the first integrity information and a summary and/or generalization of the first integrity information.

A first system may for example be a gateway of an industrial network. The first system records its integrity by way of an integrity recording module. The integrity recording module may for example comprise a measurement unit and an integrity unit. A transmission module provides first integrity information to a confirmation device. The confirmation device may for example confirm the integrity to the first system using the second integrity information, such as for example attest the activity and up-to-dateness of a virus scanner. In order to be able to inspect the summarized second integrity information, the first system in particular comprises a second inspection module that is able to check the second integrity information. The second inspection module is in particular configured so as to inspect the summary of first integrity information against a second inspection rule.

In one advantageous embodiment, the first system comprises a confirmation device according to the embodiment of the present invention.

The confirmation device may be integrated in a first system, for example a gateway. It is also possible for the confirmation device to be connected to the first system such that it operates as a security module of the first system. In other words, the confirmation device, in the method according to the embodiment of the present invention, takes over the integrity confirmation of the first system and may thus be implemented for example as a hardware security module of the first system. This is advantageous in particular since the integrity confirmation and inspection, that is to say in particular the evaluation of the measurement information, to a second system is able to take place efficiently in a system. It is conceivable for the second integrity information also to be provided to a second system for inspection.

According to a further aspect, the embodiment of the present invention relates to a second system that is connected to a first system via a communication connection, comprising a third inspection module that is designed to inspect provided second integrity information against a third inspection rule.

A second system may for example be a gateway in a data network between which and a first system a data exchange is intended to take place. To this end, the integrity of the first system is in particular first of all inspected in the confirmation device and this information is provided to the second system. By way of example, the second system may also comprise modules of the described first system, such that in particular a mutual integrity check is able to be performed by the confirmation device.

A further aspect of the embodiment of the present invention relates to a computer program product (non-transitory computer readable storage medium having instructions, which when executed by a processor, perform actions) that is able to be loaded directly into a programmable computer or processor, comprising program code portions that are suitable for performing the steps of the method.

BRIEF DESCRIPTION

Some of the embodiments will be described in detail, with reference to the following figures, wherein like designations denote like members, wherein.

Parts corresponding to one another are provided with the same reference signs in all of the figures.

DETAILED DESCRIPTION

Figure 1:
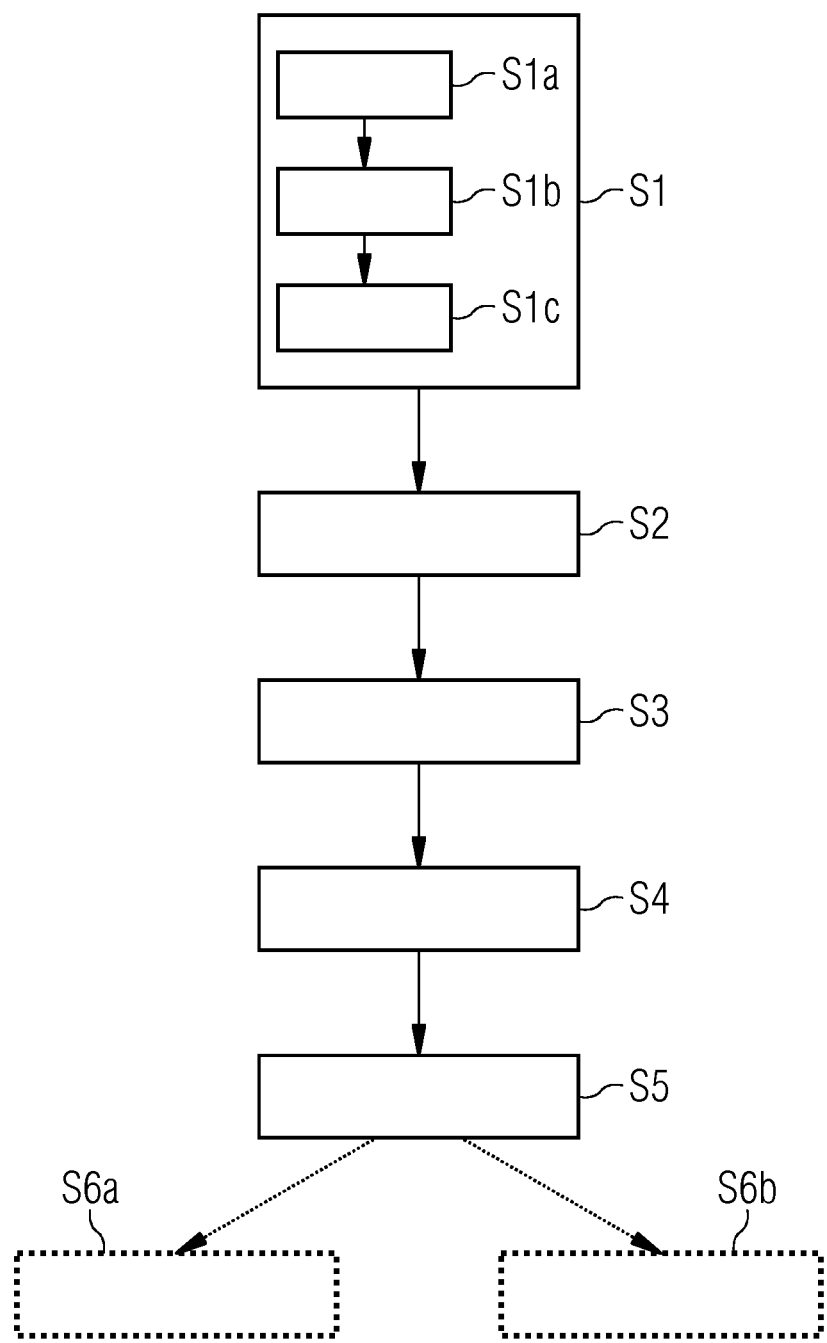
FIG. 1 depicts a flowchart of the method for the computer-aided inspection and confirmation of at least one system state of a first system using a confirmation device.

FIG. 1 shows a flowchart of the method according to the embodiment of the present invention for the computer-aided inspection and confirmation of at least one system state of a first system 1 using a confirmation device 2, in particular to a second system 3, having the following method steps. The confirmation device 2, the first system 1 and the second system 3 are illustrated by way of example in FIG. 2.

In the first step S1, first integrity information of the first system 1 is determined in the first system 1. The first integrity information comprises an integrity value, at least one measured value and associated measurement information. The at least one measured value and the associated measurement information may for example be present in a list. At least one measurement of a system state is performed and in the process a measured value and the measurement information are recorded, see step S1a. The integrity value is calculated using the at least one measured value, see step S1b. The integrity value is calculated for example using individual measured values by way of a hash function. The integrity value is updated when a new measurement is present, that is to say measurements are processed in succession. The measured values and measurement information are transmitted as part of the first integrity information, for example in a list.

The integrity value is calculated in particular depending on the at least one measured value. The integrity value may also be calculated for example using measurements and at least one nonce, for example a random number. The first integrity information may therefore accordingly also comprise the nonce. The nonce may be provided by the first system 1 or by the confirmation device 2. It is thus not possible to use an integrity value to conclude as to an associated configuration of a system. The integrity value is confirmed by a trust module 12 of the first system 1, for example digitally signed, see step S1c.

In the next step S2, the first integrity information is transmitted to the confirmation device 2. The confirmation device 2 may for example be a cloud-based or central system that performs the integrity inspection and confirmation of a first system 1, for example to a communication partner.

In the next step S3, the first integrity information is inspected against a first inspection rule in the confirmation device 2. The inspection may comprise checking the integrity value and checking or evaluating the integrity information in terms of content. In the integrity value, the confirmation, that is to say the digital signature, is for example checked. A check in terms of content, that is to say an inspection as to how the measurements underlying the integrity value came about, takes place on the basis of the measured values and the measurement information. The first system 1 issues first integrity information that contains detailed information about the system configuration and the system state. The confirmation device 2 may therefore perform a detailed evaluation of the at least one system state and/or configuration of the first system 1.

In the next step S4, the confirmation device 2 provides second integrity information that comprises at least part of the first integrity information. Following the inspection, the confirmation device 2 issues second integrity information. The second integrity information may represent a summary or abstract version of the first integrity information. By way of example, the second integrity information may contain only permissible information.

Permissible information may be for example information to which a second system 3 has a right. Permissible information may also be information that is inspected against an inspection rule and is declared as valid. Permissible information may in particular be predefined, for example information may be permitted depending on a system state of a second system 3. By way of example, a system may be in a maintenance state and therefore only have the right to obtain restricted information. In particular when the confirmation device 2 issues the second integrity information for a second system 3 that has only restricted rights, the second integrity information may be used to make a statement about the integrity of the first system without confidential information of the first system being disclosed.

In step S5, a second trust module 24 of the confirmation device 2 attests the second integrity information. There is thus integrity information of the first system 1 that in particular contains only permissible or required information. By way of example, this may confirm that an operating system of a known distribution is present or that the installed software is up to date, wherein detailed information about installed software is not present.

In one advantageous step S6a, the second integrity information may be provided to the first system 1. This allows the first system 1 to be able to check its own integrity. The first system 1 therefore inspects the second, for example abstract, integrity information against a second inspection rule. This may for example be advantageous when the first system 1 is intended to perform only a quick and limited check on system states. The inspection reveals whether the integrity of the first system 1 is confirmed or invalid. If the inspection reveals that weak points are present in the first system 1, the confirmation device 2 may communicate information about this to the first system 1. By way of example, in such a case, the second integrity information may contain a negative integrity confirmation. This method step is advantageous when the first system 1 is intended for example to activate a network interface only when it is in a trustworthy state.

In an alternative advantageous step S6b, the second integrity information may be provided to a second system 3. The confirmation device 2 creates second integrity information that confirms the integrity of the first system 1 to the second system 3. In the second system 3, as shown by way of example in FIG. 2, the second integrity information may be inspected against a third inspection rule in a third inspection module 31. This method step is in particular advantageous when two systems 1 and 3 have to mutually confirm their integrity before a data exchange. In this case, the confirmation device 2 may centrally take over the inspection and confirmation of the integrity and issue second abstract integrity information. The second integrity information may in particular be issued depending on one of the systems, for example its state, security status or rights.

Figure 2:
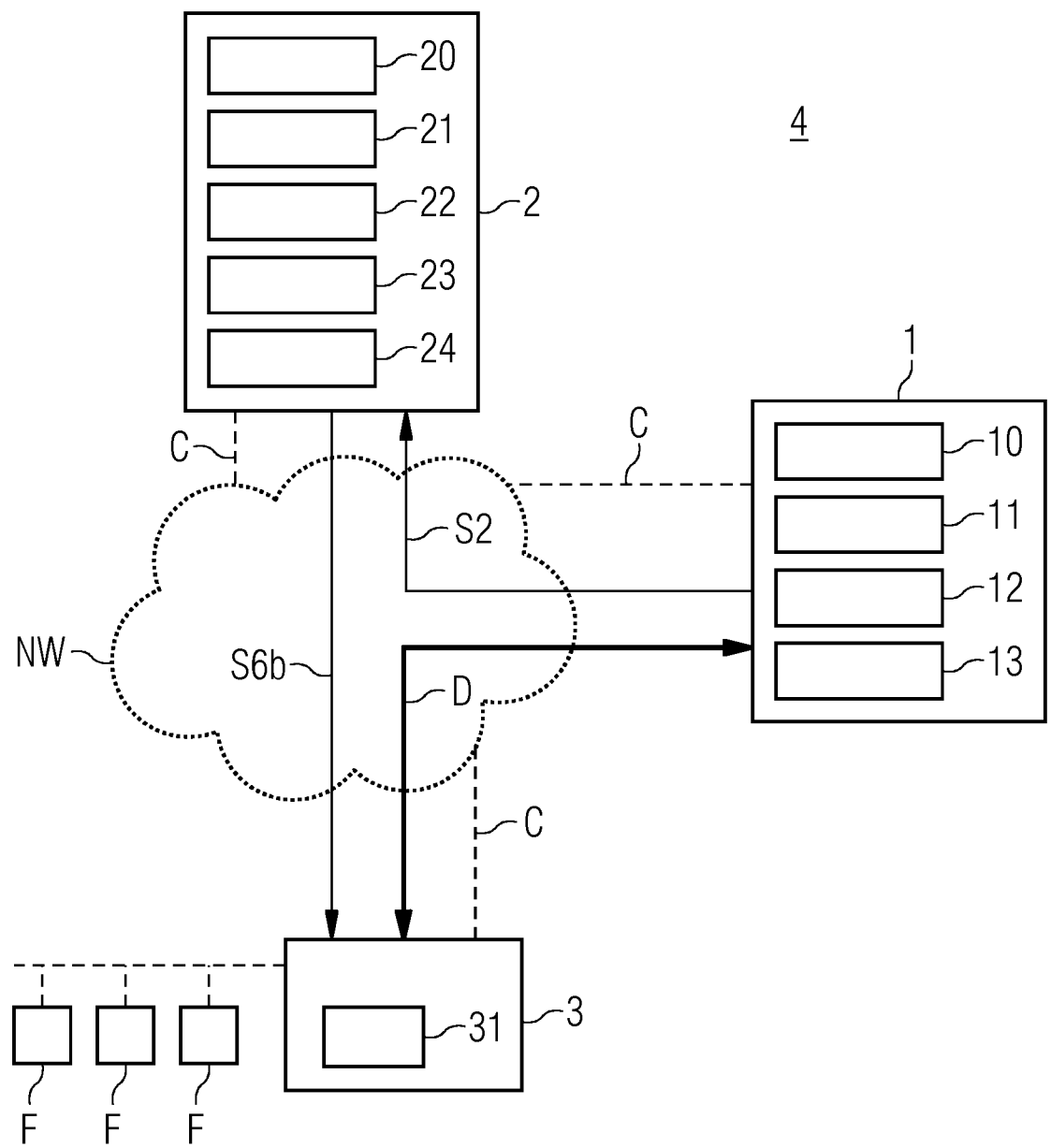
FIG. 2 depicts an exemplary illustration of a communication network containing exemplary embodiments of the confirmation, of the first system and of the second system for performing the method.

FIG. 2 schematically shows a communication network 4 containing the first system 1, the confirmation device 2 and the second system 3, which are designed to perform the method according to the embodiment of the present invention. The two systems 1, 3 and the confirmation device are connected to one another to a network NW via communication connections C and are thus able to communicate with one another. This may for example be an industrial data network. An integrity confirmation of the first system 1 to the second system 3 according to the method is shown, wherein the confirmation device 2 inspects and confirms the integrity. The second system 3 is for example a gateway that is connected to field devices F of a network. Data from the field devices F are intended to be exchanged with the first system 1. To this end, integrity attestation of the first system 1 is first of all necessary. The confirmation device 2 for example provides a central integrity attestation service.

The first system 1 first of all provides the first integrity information, which is confirmed by a trust module 11 in the first system 1. The first integrity information is transmitted to the confirmation device 2, for example via the network NW, see step S2.

The reception module 20 of the confirmation device 2 receives the first integrity information from the first system 1. The first integrity information may be stored or just buffer-stored in the storage module 21, such that the information is present for inspecting and evaluating the configuration of the first system 1. The first integrity information is inspected against a first inspection rule in the first inspection module 22 of the confirmation device 2. Depending on the result of the inspection, second integrity information that contains for example a summary of the relevant information of the first integrity information is provided in the provision module 23. The second integrity information is cryptographically confirmed by the second trust module 24.

The second integrity information is provided to the second system 3, step S6b. The second system 3 may for example be a device with restricted rights. In other words, only permissible information of the first system 1 is provided to the second system 3. The confirmation device 2 issues second integrity information such that said second integrity information contains only permissible information. In other words, the confirmation device 2 inspects the first integrity information depending on the second system 3 and issues second integrity information depending on the second system 3. By way of example, this may depend on a system state of the second system 3. The second system 3 may for example request only summarized information about the system state of the first system 1 before a data exchange takes place between the two systems 1, 3.

Second integrity information may furthermore be confirmed together with a nonce. The nonce may be provided by a first system 1, by the confirmation device 2 or by a second system 3. If for example the second confirmed integrity information contains a nonce of the second system 3, the second integrity information may be assigned directly to the second system 3.

The second system 3 may inspect the second integrity information against a third inspection rule in a third inspection module 31. The confirmation device 2 accordingly transmits the second integrity confirmation of the first system 1 to the second system 3. If this is validated in the second system 3, a data exchange D with the first system 1 may take place. By way of example, in the case of a positive integrity confirmation, the second system 3 may authorize an interface for a data exchange with the first system 1. The second system 3 may in particular also contain further modules. By way of example, the second system 3 may contain the same modules as the first system, such that the second system 3 is able to confirm its integrity to another system. A confirmation device 2 may therefore perform a mutual integrity attestation of at least two systems 1, 3.

Figure 3:
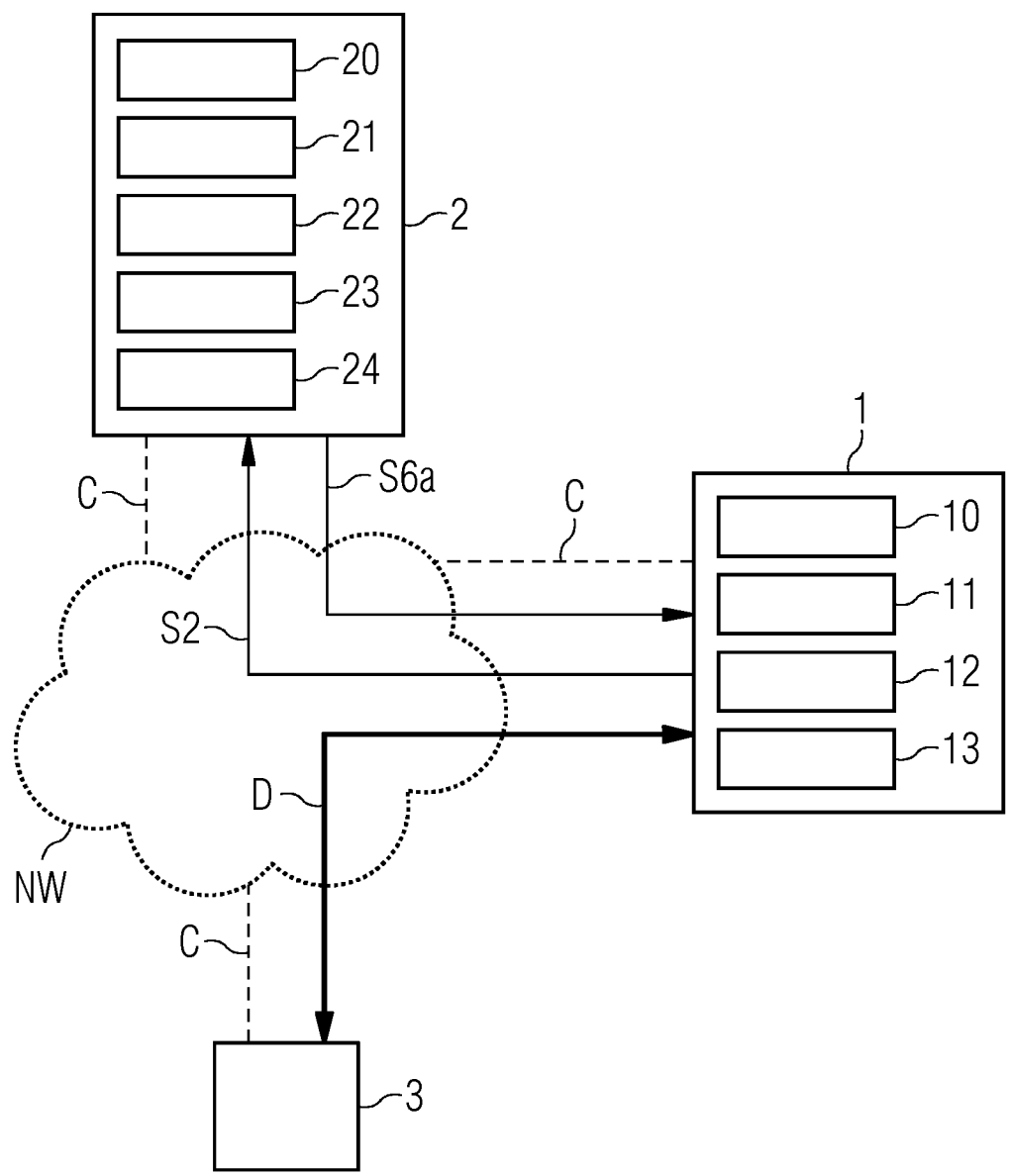
FIG. 3 depicts an exemplary illustration of the method for the computer-aided inspection and confirmation of at least one system state of a first system using a confirmation device.

FIG. 3 illustrates an example of the method, wherein a first system 1 receives second integrity information of the confirmation device 2 in order to check its own integrity before a data exchange D is performed with a second system 3. The first system 1 records the first integrity information in an integrity recording module 10, confirms it using a trust module 11 and transmits it to the confirmation device 2 using a transmission module 12. The modules of the first system 1 may advantageously all be connected to one another. The confirmation device 2, after a successful inspection, determines second integrity information and confirms it cryptographically. By way of example, the second integrity information may contain information about the system state of the first system 1, for example whether a particular operating system is running. This second integrity information is provided to the first system 1 again in step S6*a*. The first system 1 may inspect the second integrity information in a second inspection module 13. To this end, the first system may evaluate the second integrity information and authorize the data exchange with the second system 3 in the case of a positive integrity confirmation, that is to say for example an interface for a data transmission D may be activated in the first system 1.

Figure 4:
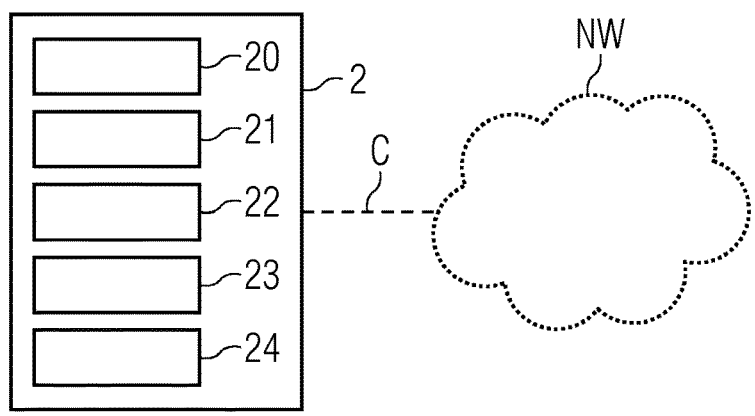
FIG. 4 depicts a schematic illustration of an exemplary embodiment of the confirmation device.

FIG. 4 schematically illustrates an example of the confirmation device 2 according to the embodiment of the present invention. The confirmation device 2 comprises a reception module 20, a storage module 21, a first inspection module 22, a provision module 23 and a second trust module 24. The modules of the confirmation device 2 may advantageously all be connected to one another. A confirmation device 2 may furthermore comprise a processor, a memory and an operating system (not illustrated) in order to perform the steps of the method for the computer-aided inspection and confirmation of the integrity of a system. The confirmation device 2 may be connected to a network NW via a communication connection C or it may be formed in a manner integrated in a first system 1. The confirmation device 2 may in particular comprise an interface or a transmission module (not illustrated) in order to transmit the second integrity information to a system.

Figure 5:
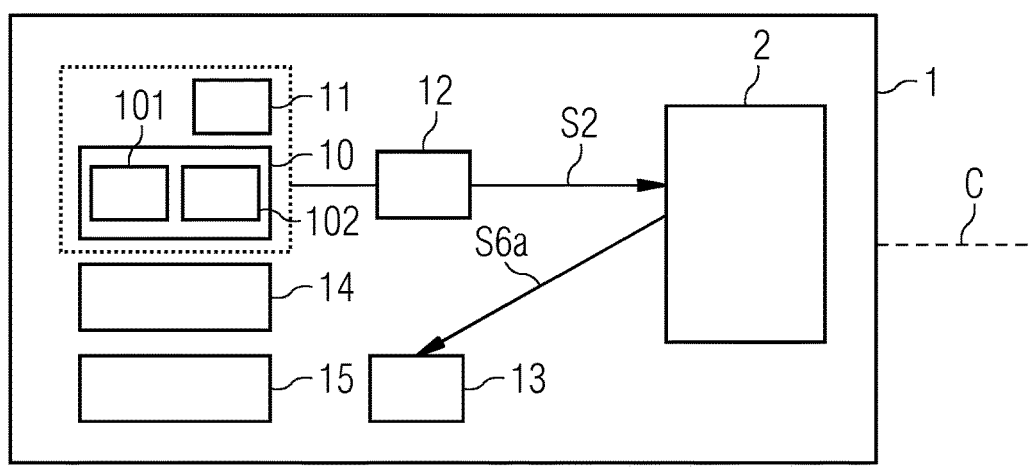
FIG. 5 depicts a schematic illustration of an exemplary embodiment of the first system.

FIG. 5 shows an exemplary embodiment of the first system 1 that comprises a confirmation device 2. The first system 1 may for example comprise an integrated confirmation device 2 for the integrity attestation. By way of example, the confirmation device 2 is a hardware security module in the first system 1 or connected to the first system 1 or a cryptocontroller. The confirmation device 2 may be independent from the first system 1, that is to say for example not connected to the internal data network of the first system, in order for example not to be able to be compromised. The first system 1 contains an integrity recording module 10, a trust module 11, a transmission module 12, an inspection module 13, a processor 14, a memory 15 and may be connected to a network NW via a communication connection C. The integrity recording module may in particular comprise a measurement unit 110 and an integrity unit 120. The measurement unit 110 and the integrity unit 120 may also be formed independently from the integrity recording module 10. The measurement unit 110 measures the states of the first system 1 and provides these as measured values and associated measurement information. By way of example, the measurements may be controlled by the operating system or a specific item of software. The integrity unit 120 calculates an integrity value depending on the measured values, for example using a hash function. An operating system and various applications may furthermore be installed in the first system 1 (not shown). All of the modules may advantageously be connected to one another in the first system 1.

Measured values are recorded by the integrity recording module 10, confirmed as an integrity value by the trust module 11 and provided to the second system 3 together with the measurement information as first integrity information, see step S2 in FIG. 1. The for example integrated confirmation device 2 inspects the first integrity information and creates second integrity information depending thereon. This second integrity information is cryptographically confirmed in the confirmation device and transmitted to the second inspection module 13 of the first system 1, see step S6*b* in FIG. 1.

The second inspection module 13 determines, on the basis of the second integrity information and against a second inspection rule, whether the first system 1 is in a trustworthy system state. If the inspection of the integrity of the first system 1 is declared as valid, the first system 1 will authorize an interface for data transmission. The second integrity information may additionally be transmitted to a second system 3.

Figure 6:
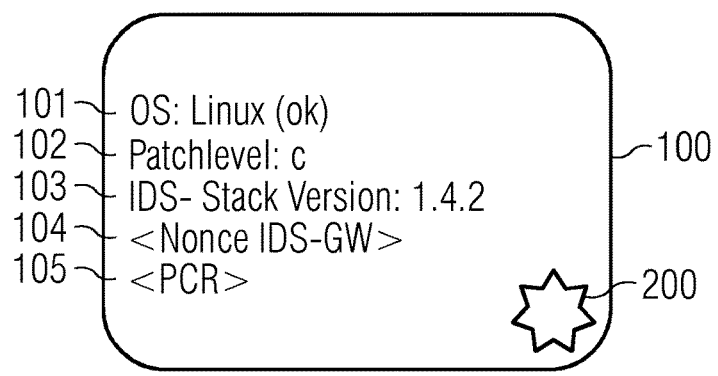
FIG. 6 depicts a schematic illustration of an exemplary embodiment of second integrity information.

FIG. 6 shows a schematic illustration of an example of second integrity information 100. The second integrity information may for example be coded as a text file, as abstract syntax notation one data, also called ASN.1 data, as extensible markup language data, also called XML data, or as JavaScript object notation data, also called JSON data. The second integrity information may in particular be assigned to the first system 1, for example using identification information or the integrity value.

Following the inspection of the first integrity information, that is to say of the integrity value, of the measured values and measurement information of the first system 1, the confirmation device 2 outputs a summarized integrity confirmation as second integrity information depending on the inspection. This may be confirmed with a digital signature 200 in the second trust module 24. FIG. 6 shows an example of such a summary of the first integrity information as second integrity information 100. This for example contains confirmation that a Linux operating system is present in a known distribution 101 and that the patch level 102 is up to date. The entry 103 confirms for example the version of the IDS software stack. It may optionally contain further information, such as for example a nonce value 104 of the second system 3, for example of an IDS gateway to which the attestation is provided in the form of the second integrity information 100, and the integrity value 105, PCR, of the original first integrity information. The latter allows for example unambiguous assignment of the confirmed second integrity information to a particular integrity value. The originally issued first integrity information, with the integrity value contained therein, may thereby also be inspected by the second system 3.

All of the features that are described and/or illustrated may advantageously be combined with one another in the scope of the embodiment of the present invention. The present invention is not restricted to the described exemplary embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for computer-aided inspection and cryptographic confirmation of at least one system state of a first system using a confirmation device, the method comprising:
  recording first integrity information of the first system that comprises an integrity value, at least one measured value and at least one item of measurement information, wherein:
    the at least one measured value and the at least one item of measurement information are recorded in at least one measurement of the at least one system state,
    the integrity value is calculated depending on the at least one measured value,
    the integrity value is cryptographically confirmed by a first trust module of the first system;
  transmitting the first integrity information to the confirmation device;
  inspecting the first integrity information in the confirmation device against a first inspection rule;
  outputting second integrity information by the confirmation device, wherein the second integrity information comprises a part of the first integrity information and at least one of a summary and a generalization of the first integrity information, and wherein the second integrity information contains information about the at least one system state of the first system, including a presence of an installed item of software or a running operating system; and
  cryptographically confirming the second integrity information using a second trust module in the confirmation device;
  in response to cryptographically confirming the second integrity information, providing the second integrity information to a second system over an industrial data network, wherein the first system, the second system, and the confirmation device are each connected to each other on the industrial data network, and the first system and the second system are peer nodes on the industrial data network such that the first system and the second system mutually confirm integrity before a data exchange occurs between the first system and the second system on the industrial data network.

2. The method as claimed in claim 1, wherein the confirmation device recognizes weak points in the first system on a basis of the first integrity information and transmits information about the weak points to the first system.

3. The method as claimed in claim 1, wherein the first integrity information is inspected in the confirmation device depending on the second system to which the second integrity information is provided, and the second integrity information is output depending on the second system.

4. The method as claimed in claim 1, wherein the second integrity information is confirmed in the confirmation device by a second trust module together with a nonce.

5. The method as claimed in claim 1, wherein the integrity value is calculated using measurements of the system state of the first system and using at least one nonce.

6. The method as claimed in claim 1, wherein the second integrity information comprises information about a security status of the first system.

7. The method as claimed in claim 1, wherein the data exchange takes place between the first system and the second system after the integrity and/or the configuration of the first system has been declared as valid in the confirmation device.

8. A confirmation device for computer-aided inspection and cryptographic confirmation of at least one system state of a first system, comprising:
  a processor; and
  a memory;
  wherein the configuration device is configured to:
    receive first integrity information of the first system;
    store the first integrity information;
    inspect the first integrity information against a first inspection rule;
    provide second integrity information, wherein the second integrity information comprises part of the first integrity information and at least one of a summary and a generalization of the first integrity information, and wherein the second integrity information contains information about the at least one system state of the first system, including a presence of an installed item of software or a running operating system; and
    cryptographically confirm the second integrity information;
    in response to cryptographically confirming the second integrity information, providing the second integrity information to a second system over an industrial data network, wherein the first system, the second system, and the confirmation device are each connected to each other on the industrial data network, and the first system and the second system are peer nodes on the industrial data network such that the first system and the second system mutually confirm integrity before a data exchange occurs between the first system and the second system on the industrial data network.

9. A first system, comprising:
  a processor; and
  a memory;
  wherein the first system is configured to:
    record first integrity information of the first system that comprises an integrity value, at least one measured value and at least one item of measurement information; wherein:
      a measurement unit records at least one measured value and at least one item of measurement information in at least one measurement of the at least one system state, and
      an integrity unit calculates an integrity value depending on the at least one measured value,
    confirm the first integrity information,
    transmit the first integrity information to a confirmation device, and inspect second integrity information provided by the confirmation device against a second inspection rule, wherein the second integrity information comprises part of the first integrity information and at least one of a summary and a generalization of the first integrity information, and wherein the second integrity information contains information about the at least one system state of the first system, including a presence of an installed item of software or a running operating system, wherein the second integrity information is provided to a second system over an industrial data network, the first system, the second system, and the confirmation device are each connected to each other on the industrial data network, and the first system and the second system are peer nodes on the industrial data network such that the first system and the second system mutually confirm integrity before a data exchange occurs between the first system and the second system on the industrial data network.

10. The first system as claimed in claim 9, wherein the system further comprises the confirmation device.

11. A computer program product, comprising a computer readable hardware storage device having computer readable program code stored therein, said program code executable by a processor of a computer system to implement a method for computer-aided inspection and cryptographic confirmation of at least one system state of a first system using a confirmation device, the method comprising:

recording first integrity information of the first system that comprises an integrity value, at least one measured value and at least one item of measurement information, wherein:

the at least one measured value and the at least one item of measurement information are recorded in at least one measurement of the at least one system state, the integrity value is calculated depending on the at least one measured value, the integrity value is cryptographically confirmed by a first trust module of the first system;

transmitting the first integrity information to the confirmation device;

inspecting the first integrity information in the confirmation device against a first inspection rule;

outputting second integrity information by the confirmation device, wherein the second integrity information comprises a part of the first integrity information and at least one of a summary and a generalization of the first integrity information, and wherein the second integrity information contains information about the at least one system state of the first system, including a presence of an installed item of software or a running operating system; and cryptographically confirming the second integrity information using a second trust module in the confirmation device;

in response to cryptographically confirming the second integrity information, providing the second integrity information to a second system over an industrial data network, wherein the first system, the second system, and the confirmation device are each connected to each other on the industrial data network, and the first system and the second system are peer nodes on the industrial data network such that the first system and the second system mutually confirm integrity before a data exchange occurs between the first system and the second system on the industrial data network.

12. The method as claimed in claim 1, wherein the confirmation device is part of the first system.

13. The method as claimed in claim 1, wherein the part of the first integrity information comprises only non-sensitive information.

14. The method as claimed in claim 1, wherein the second integrity information contains information about an operating system of the first system.

\* \* \* \* \*